United States Patent [19]

Crossett et al.

[11] Patent Number: 4,700,047
[45] Date of Patent: Oct. 13, 1987

[54] FUEL PREHEATER FOR DIESEL ENGINES

[75] Inventors: Joseph J. Crossett; Mark C. Crossett, both of Washington, Iowa

[73] Assignee: Crossett & Sons, Inc., Washington, Iowa

[21] Appl. No.: 866,371

[22] Filed: May 23, 1986

[51] Int. Cl.$^4$ .................... H05B 3/82; F24H 1/14; F02M 31/00

[52] U.S. Cl. .................... 219/205; 123/549; 123/557; 165/163; 219/303; 219/306; 219/326

[58] Field of Search .................... 219/205–207, 219/306, 303, 304, 326; 165/163; 123/549, 557

[56] References Cited

U.S. PATENT DOCUMENTS

| | | | |
|---|---|---|---|
| 2,458,826 | 1/1949 | Blumberg et al. | 165/163 X |
| 3,110,296 | 11/1963 | Lumdi | 123/557 |
| 3,989,019 | 11/1976 | Brandt et al. | 123/557 |
| 4,044,742 | 8/1977 | Linder | 123/557 X |
| 4,114,566 | 9/1978 | Harpman | 123/549 X |
| 4,180,036 | 12/1979 | Wolf | 123/557 X |
| 4,326,491 | 4/1982 | Burchett | 123/557 |
| 4,475,523 | 10/1984 | Goranflo | 123/549 X |
| 4,499,886 | 2/1985 | Hinds | 123/557 |

FOREIGN PATENT DOCUMENTS

| | | | |
|---|---|---|---|
| 17123 | 10/1980 | European Pat. Off. | 123/557 |
| 730960 | 1/1943 | Fed. Rep. of Germany | 123/557 |

Primary Examiner—Anthony Bartis
Attorney, Agent, or Firm—James C. Nemmers

[57] ABSTRACT

A fuel preheating unit for diesel engines includes a heat exchange coil positioned in a fluid-tight enclosure having an inlet and outlet for a heat exchange medium, such as hot coolant or lubricant from the engine. The coil has a length of at least one foot for each 25 cubic inches of enclosure volume and has ends connected to a diesel fuel inlet and outlet on the enclosure. A spray tube connected to the heat exchange medium inlet extends horizontally below the entire length of the coil and has a plurality of upwardly directed openings for discharge of the heat exchange medium toward the coil for agitation of the medium in the enclosure around and over the coil. The enclosure is provided with an electric heater for heating the heat exchange medium during cold weather to assist in heating the fuel prior to the time the engine reaches operating temperature.

4 Claims, 2 Drawing Figures

FUEL PREHEATER FOR DIESEL ENGINES

BACKGROUND OF THE INVENTION

The prior art discloses numerous forms of fuel heaters that purport to increase fuel efficiency of engines utilizing liquid fuel, both internal combustion and diesel engines. The problems are somewhat different when preheating fuel for internal combustion engines then when preheating diesel fuel for diesel engines. Although there are known units for preheating fuel utilizing the heat from the engine coolant, these units have not produced substantial enough savings in fuel to justify their cost. Also, in extremely cold weather, the units of the prior art have not proven to be effective in preventing gelling. Therefore, there is a need for a simple and inexpensive but yet efficient form of preheating unit which will in fact substantially improve the fuel consumption and one which will also be effective in extremely cold temperatures.

SUMMARY OF THE INVENTION

The fuel preheating unit of the invention includes a heating coil inside a heat exchanger through which the engine coolant or engine oil is passed. The diesel fuel is passed through the heating coil which is immersed in the engine coolant thereby raising the temperature of the fuel to a predetermined desired temperature after which the heated and now expanded fuel is introduced into the engine. The coolant is introduced into the heat exchanger through a spray tube extending along the bottom of the unit, and this agitates the coolant over and around the heat exchange coil to increase the heat exchange rate. The unit is also provided with an electrical heating element for use in extremely cold temperatures to preheat coolant in the heat exchanger and thus warm the fuel until the engine operating temperature is reached.

DESCRIPTION OF THE PREFERRED EMBODIMENT OF THE INVENTION

Figure 1:
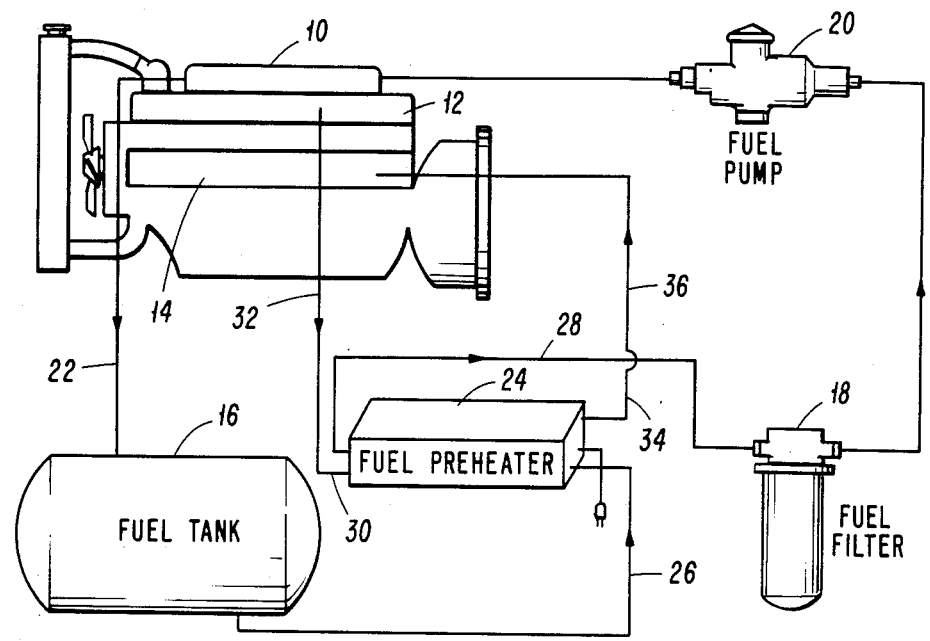
FIG. 1 is a schematic diagram of the fuel system of a diesel engine and showing the preheating unit of the invention in place in the system.

Referring first to FIG. 1, there is shown schematically a diesel engine 10 which has a high water jacket 12 and a low water jacket 14. The engine 10 is supplied with fuel from a tank 16, the fuel being pumped through a fuel filter 18 by a fuel pump 20 into the combustion chambers (not shown) of the engine in a well-known manner. An overflow line 22 returns excess fuel to the tank 16.

In FIG. 1 is shown in place in the system just described a fuel preheating unit indicated generally by the reference numeral 24. As illustrated in FIG. 1, the preheating unit is mounted in the fuel line between the tank 16 and filter 18, the unit 24 having a fuel inlet 26 and a fuel outlet 28. The preheating unit 24 also has a water inlet 30 supplied by a line 32 connected to the high water jacket 12 and a water outlet 34 connected by line 36 to the low water jacket 14. The details of the fuel preheating unit 24 will now be described in detail.

Figure 2:
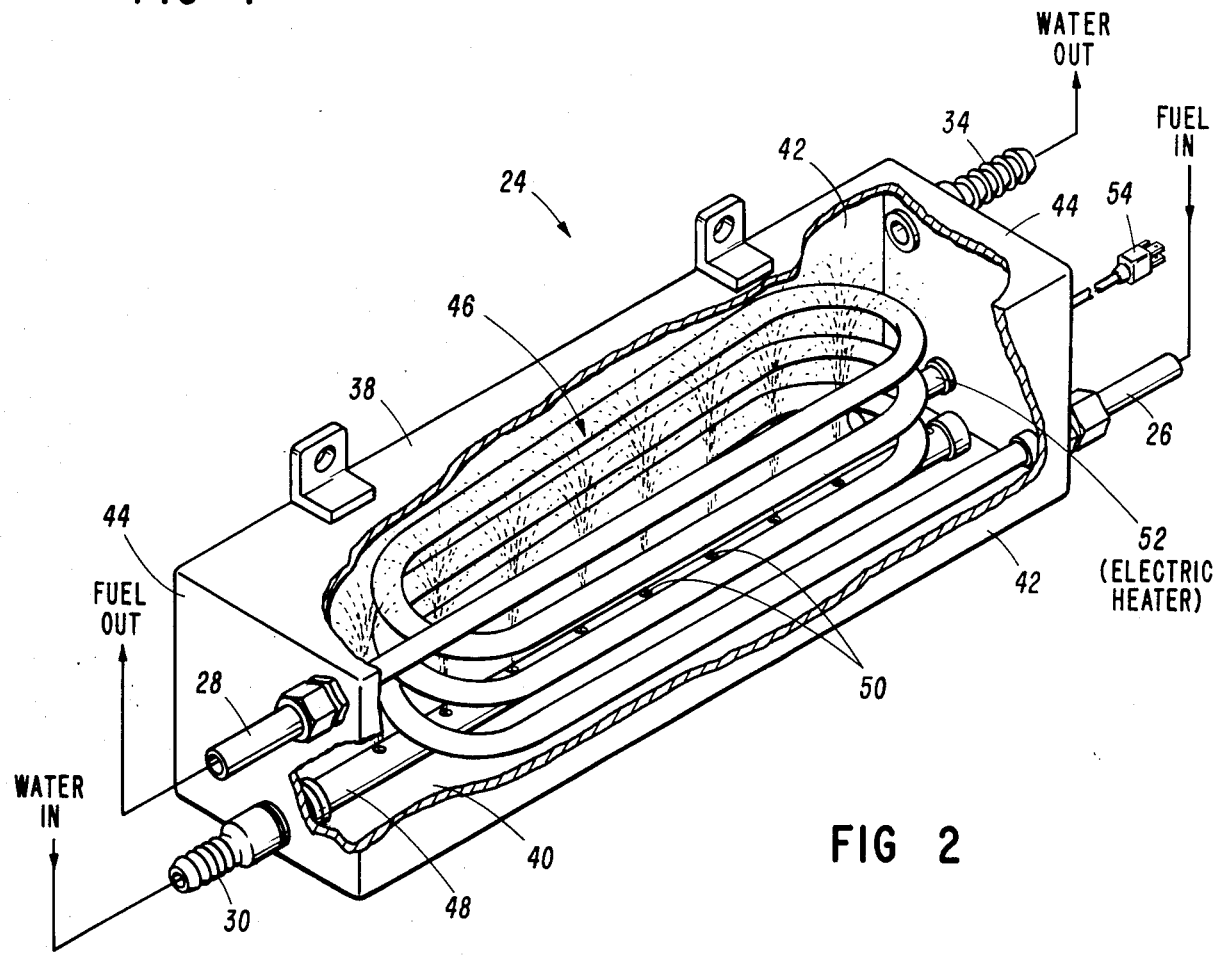
FIG. 2 is a perspective view, partly in section, of a preheating unit constructed according to the principles of the invention.

Referring to FIG. 2, the fuel preheating unit 24 is preferably a rectangular shaped enclosure having a top wall 38, a bottom wall 40 which are joined by side walls 42 and end walls 44. As seen in FIG. 2, the water outlet 34 and fuel inlet 26 are in one end wall while the fuel outlet 28 in water inlet 30 are in the opposite end wall 44.

Inside of the enclosure, there is a heat exchange coil 46, which consists of a plurality of loops of tubing through which the heated fuel flows from the inlet 26 to the outlet 28, being pumped through the unit by the fuel pump 20. Positioned along the bottom wall 40 and connected to the water inlet 26, is a spray tube 48. As shown in FIG. 2, spray tube 48 extends from the water inlet 30 in one end wall 44 to the other end wall 44, the tube 48 having formed along its top surface a plurality of openings 50. The end of tube 48 opposite the water inlet 30 is closed, and thus pressurized water entering water inlet 30 will be sprayed upwardly over and around the loops of the heat exchange coil 46. The enclosure comprising the unit 24 will rapidly fill with water, which will then flow out of the water outlet 34 into the low water jacket 14. The spray tube 48 will constantly agitate the water inside of the unit 24 causing it to circulate continuously over and around the coils of the heat exchange unit 46. In some instances, additional loops of coil can be used in place of the spray tube 48.

When the engine 10 has not been running and therefore the coolant from the hot water jacket 12 is cold, obviously, no heat will be supplied to the preheating unit 24 until the engine has been operated for a few minutes. Especially in cold weather, diesel fuel will gel, and we have therefore provided an electrical heating element 52 which can be plugged in to a source of electrical energy by use of the electrical cord and plug 54. Thus, especially in extremely cold weather when the diesel fuel is apt to gel, the heating unit 52 can be plugged into a source of electrical energy to prevent the fuel in the preheating unit 24 from gelling. There will be sufficient fuel in the preheating unit 24 to start the engine even when the temperature is below zero which would normally cause gelling of the fuel. Once started, the engine will quickly approach operating temperature and the hot water from the high water jacket 12 will start warming the fuel and the element 52 can be unplugged.

We have found that the ideal temperature of the fuel leaving the preheating unit 24 is 190°–195° F. The minimum temperature for the unit to be effective is 180° F. At 195° F., diesel fuel will expand 10–15% in volume, and the expansion in volume alone will produce an equivalent increase in fuel economy since the fuel enters the engine by volume and not by weight. With the unit of the invention, No. 2 diesel fuel can be used year 'round, since this type of fuel begins its expansion at 168° and reaches its maximum expansion at 196°. In this temperature range, all of the elements that comprise the diesel fuel are at the optimum temperature for ignition. For this reason, we have also discovered that the engine will run cleaner, and emissions will be reduced as much as 78%. The familiar black smoke that is customarily emitted from the exhaust of diesel engines is virtually eliminated particularly during the acceleration of the engine from a lower to higher speed.

We have also found that since the fuel is expanded when it is pumped into the fuel injectors of the engine 10, less fuel is injected and more is returned to the fuel tank, through the overflow line 22. This fuel is already preheated, and in turn assists in heating the entire fuel system. Using the preheating unit of the invention, all gelling of diesel fuel has been eliminated without the necessity of additives. Moreover, a vehicle operator is able to use the less expensive No. 2 fuel year round.

The preheating unit of the invention has application in any type of diesel engine such as those used in passenger vehicles, trucks, semi-trucks of all sizes and construction equipment. In addition, the unit of the invention can be also be used in applications where a diesel engine is used as a stationary power unit for driving machinery. We have also found the unit of the invention to be useful in marine engines. Particularly in marine applications not cooled by fresh water cooling systems, the heat to the unit can be supplied from the engine oil rather than the engine coolant. We have found that the unit of the invention will operate equally as well when heated with engine oil as with the engine coolant.

Although the preferred embodiment shown in the drawings has not been shown as an insulated enclosure, it is preferable to provide insulation with a suitable insulating material such a styrofoam, along the end walls, side walls and top and bottom walls. It may also be preferable to insulate the incoming water line and the outgoing fuel lines to improve the efficiency of the unit.

Also, we have produced and tested units of varying sizes for different size engines. For example, a large unit for use with an engine when fuel consumption is between 4 and 21 gallons per hour, would preferably be 16" long and 4" square and contain 11 feet of $\frac{1}{2}$" copper tubing. A smaller unit for use with engines consuming fuel at the rate of up to 4.5 gallons per hour would be approximately half the volume, being 4" and 8" long and containing approximately 5 feet of $\frac{1}{2}$" copper tubing in the heat exchanger. An even smaller unit has been built that is 8" long, 6" wide and 2" tall and containing approximately 5 feet of $\frac{3}{8}$" copper tubing. The smallest of the units is generally used for small engines consuming less than three gallons of fuel per hour.

We have found that to maintain the fuel in the unit a sufficient amount of time to properly expand the fuel that approximately one foot of copper tubing is required for each twenty five cubic inches of volume of the heating fluid. If an insufficient length of tubing is used, there will not be adequate heat exchange to preheat the fuel.

The preferred embodiment of the invention has produced fuel savings of 10-20% in some applications. We have described the unit of the invention only in connection with the preferred embodiment, and have indicated that there are various revisions and modifications that can be made to the preferred embodiment without departing from the spirit and scope of the invention. It will be obvious to those skilled in the art that various other revisions and modifications can be made to the preferred embodiment. It it our intention however that all such revisions and modifications will be included within the scope of the following claims.

What is claimed is:

1. A unit for preheating fuel for diesel engines having an engine coolant system and a lubrication system utilizing a flowable lubricant, said unit comprising a housing providing a fluid-tight enclosure, a heat exchange coil positioned in and spaced above the bottom of said enclosure and having a plurality of loops providing a continuous path for the flow of the fuel to be heated, the heat exchange coil having at least one foot of length for each 25 cubic inches of volume of the enclosure, a diesel fuel outlet in said housing and connected to one end of the heat exchange coil, a diesel fuel outlet in said housing and connected to the other end of the heat exchange coil, an inlet in said housing for connection of the interior of said enclosure surrounding said coil to a source of a hot heat exchange medium in a diesel engine so as to provide a source of heat for heating said heat exchange coil, an outlet near the top of said housing to provide for return of the heat exchange medium to a diesel engine, and spray tube means extending horizontally from the inlet for the heat exchange medium and along the bottom of the housing beneath substantially the entire length of the heat exchange coil, said means having a plurality of upwardly directed openings to provide for discharge of the heat exchange medium toward the coil and agitation of the heat exchange medium in the enclosure around and over the heat exchange coil.

2. The unit for preheating fuel for diesel engines as recited in claim 1 in which the source of the heat exchange medium is the engine coolant of a diesel engine.

3. The unit for preheating fuel for diesel engines as recited in claim 1 in which the source of a heat exchange medium is the flowable lubricant from the lubrication system of a diesel engine.

4. The unit for preheating fuel as recited in claim 1 in which there is an electrical heating element in said enclosure for heating said heat exchange medium contained therein, and a means is provided for connecting said heating element to a source of electrical power.

* * * * *